US008533184B2

(12) United States Patent
Kobayashi et al.

(10) Patent No.: US 8,533,184 B2
(45) Date of Patent: Sep. 10, 2013

(54) NUMERICAL ANALYSIS DATA CREATING METHOD AND APPARATUS, AND COMPUTER-READABLE PROGRAM

(75) Inventors: Yoko Kobayashi, Kawasaki (JP); Nobutaka Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1335 days.

(21) Appl. No.: 11/504,727

(22) Filed: Aug. 16, 2006

(65) Prior Publication Data

US 2007/0198587 A1 Aug. 23, 2007

(30) Foreign Application Priority Data

Feb. 8, 2006 (JP) ................................. 2006-031595

(51) Int. Cl.
*G06F 7/00* (2006.01)
*G06F 17/30* (2006.01)
(52) U.S. Cl.
USPC .......................................... 707/722; 707/758
(58) Field of Classification Search
USPC ................. 707/1, 2, 705, 706, 722, 736, 758, 707/769, 780, 912, 944, 948
See application file for complete search history.

(56) References Cited

U.S. PATENT DOCUMENTS

| | | | | |
|---|---|---|---|---|
| 5,418,728 A | * | 5/1995 | Yada ................................ | 700/97 |
| 5,850,535 A | * | 12/1998 | Maystrovsky et al. ............ | 703/2 |
| 5,988,862 A | * | 11/1999 | Kacyra et al. ..................... | 703/6 |
| 6,195,095 B1 | * | 2/2001 | Beer et al. ...................... | 715/839 |
| 6,224,249 B1 | * | 5/2001 | Ozawa et al. ..................... | 703/1 |
| 6,295,513 B1 | * | 9/2001 | Thackston ........................ | 703/1 |
| 6,813,749 B2 | * | 11/2004 | Rassaian ........................... | 716/4 |
| 6,816,861 B2 | * | 11/2004 | Ikeda et al. ...................... | 707/10 |
| 6,920,458 B1 | * | 7/2005 | Chu et al. ....................... | 707/102 |
| 2003/0187625 A1 | * | 10/2003 | Deguchi ............................. | 703/6 |
| 2007/0174026 A1 | * | 7/2007 | Mangon et al. .................... | 703/1 |

FOREIGN PATENT DOCUMENTS

| | | |
|---|---|---|
| JP | 08-292974 | 11/1996 |
| JP | 9-34928 | 2/1997 |
| JP | 09-138812 | 5/1997 |
| JP | 11-066125 | 3/1999 |
| JP | 11-66132 | 3/1999 |

(Continued)

OTHER PUBLICATIONS

Chou et al, "A Unifying Framework for Version Control in a CAD Environment", Proceedings of the Twelfth International Conference on Very Large Data Bases (VLDB '86), Kyoto, Aug. 1986, pp. 336-344.*

(Continued)

*Primary Examiner* — Marc Somers
(74) *Attorney, Agent, or Firm* — Staas & Halsey LLP

(57) ABSTRACT

A numerical analysis data creating method creates numerical analysis data that are obtained by analyzing an analyzing target. The method judges whether or not to create the numerical analysis data of the analyzing target using data that have been stored in a database part, searches the database part based on information related to the analyzing target and displaying a search result if the numerical analysis data of the analyzing target are to be created using the stored data, and creates and stores in the database part the numerical analysis data of the analyzing target by modifying usable data if necessary, when the usable data exist in the search result. The data that have been stored in the database part include numerical analysis data, analysis model data, material characteristic data and attribute data with respect to targets that have been analyzed.

13 Claims, 21 Drawing Sheets

(56) References Cited

FOREIGN PATENT DOCUMENTS

| | | |
|---|---|---|
| JP | 2001-134783 | 5/2001 |
| JP | 2001-265836 | 9/2001 |
| JP | 2003-022288 | 1/2003 |
| JP | 2003-119041 | 4/2003 |
| WO | WO 0207015 A1 * | 1/2002 |
| WO | WO 2004059537 A1 * | 7/2004 |
| WO | WO 2005086034 A1 * | 9/2005 |

OTHER PUBLICATIONS

Office Action mailed from the Japanese Patent Office on Feb. 15, 2011 in Japanese patent application No. 2006-031595.

* cited by examiner

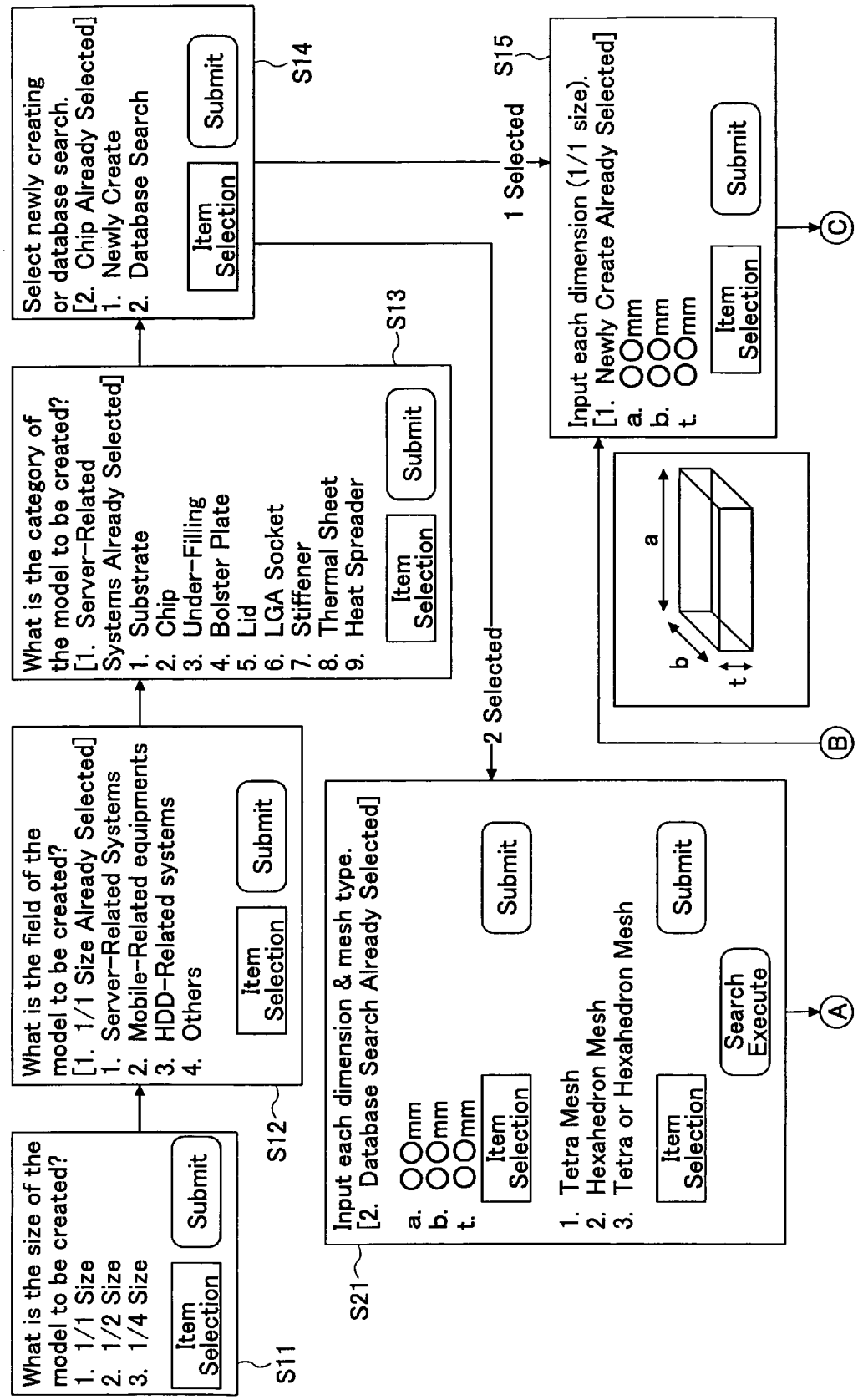

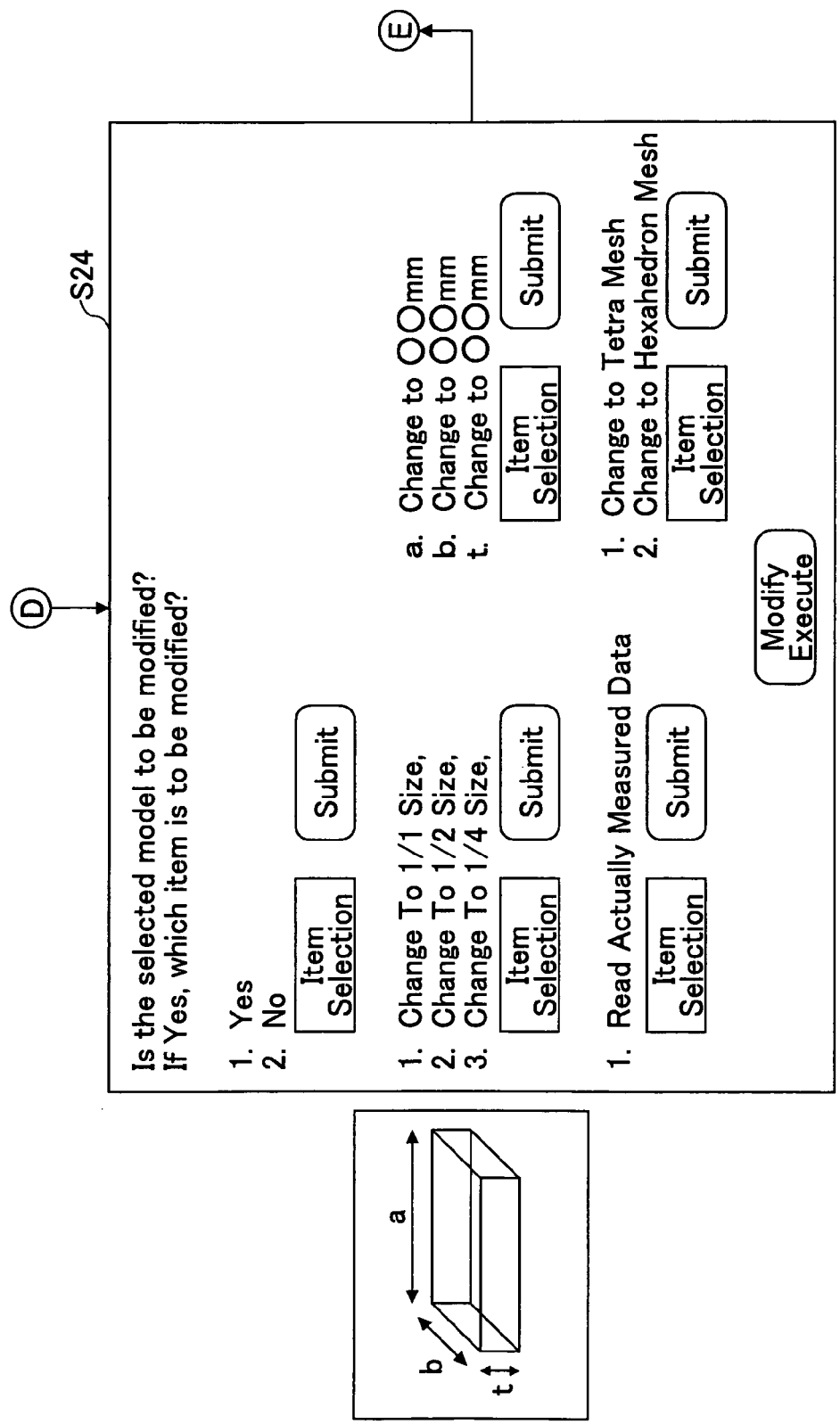

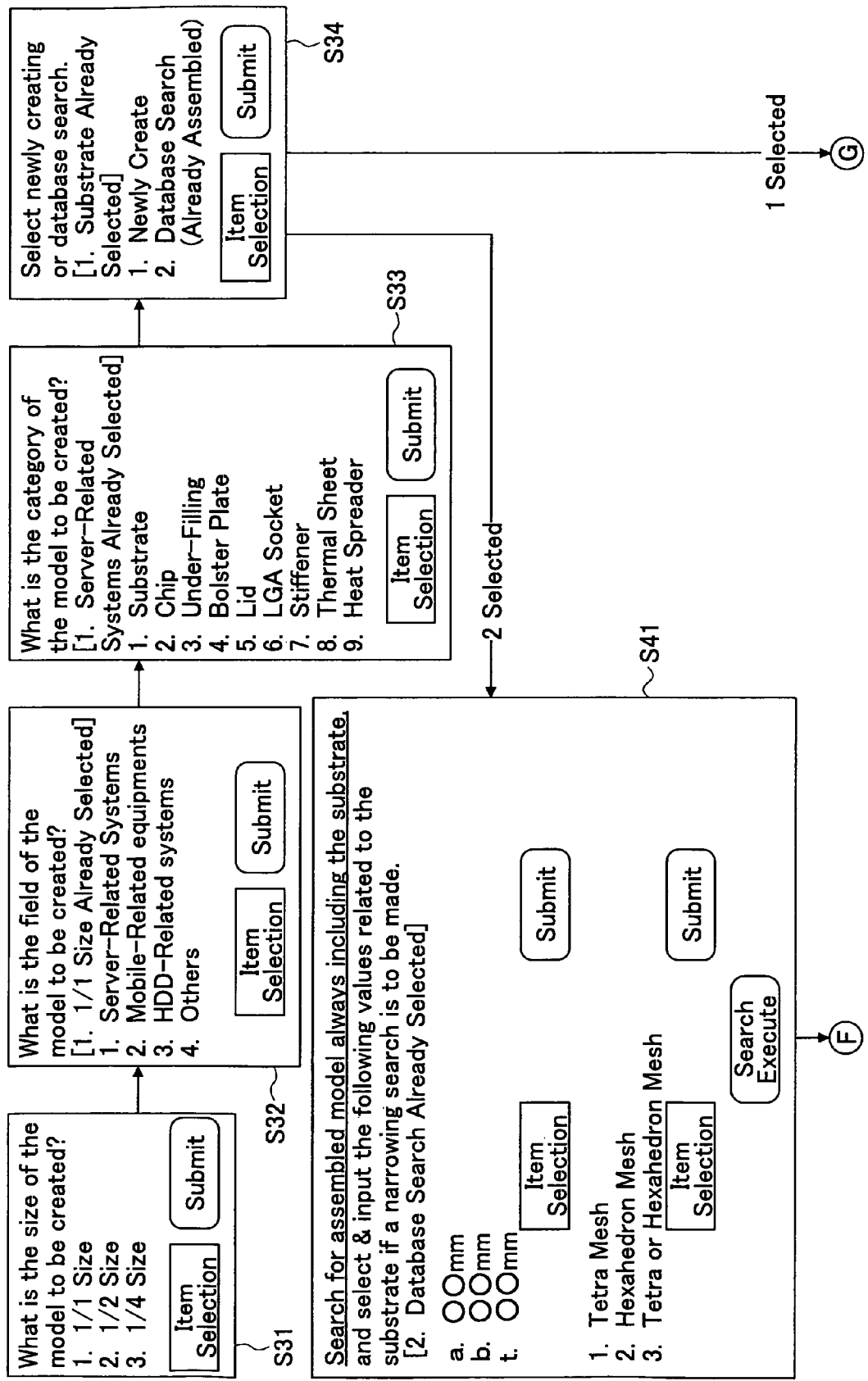

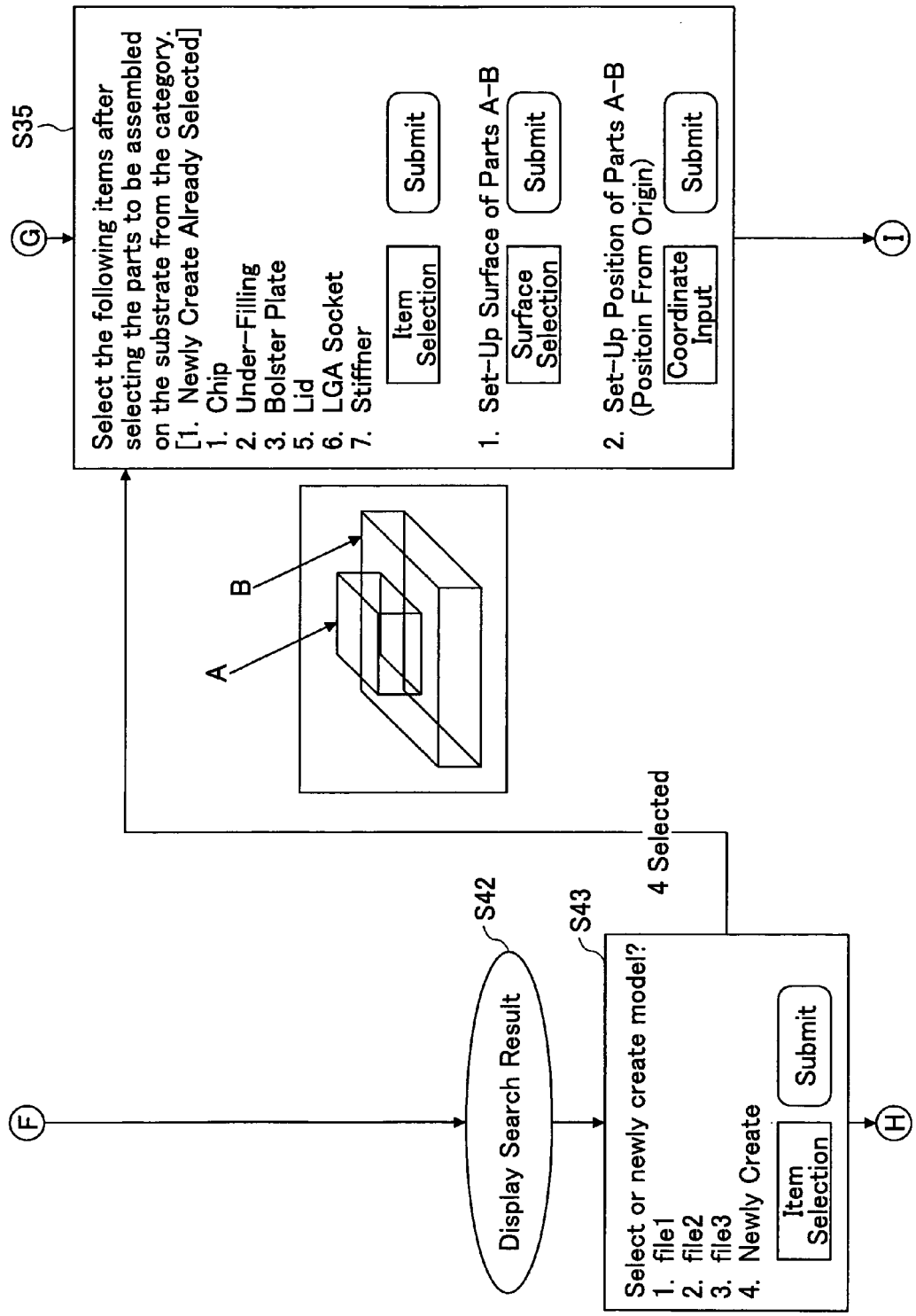

FIG.10

Select the contact or tie definition of the area contacted by each part.

1. Contact Definition
2. Tie Definition

[Item Selection] [Submit]

1. Contact → Select Between Highlighted Parts (1) Between A-B
(2) Between B-C

[Item Selection] [Submit]

2. Tie → Select Node of Surface in Contact (in Top Perspective View)

[Select Node] [Submit]

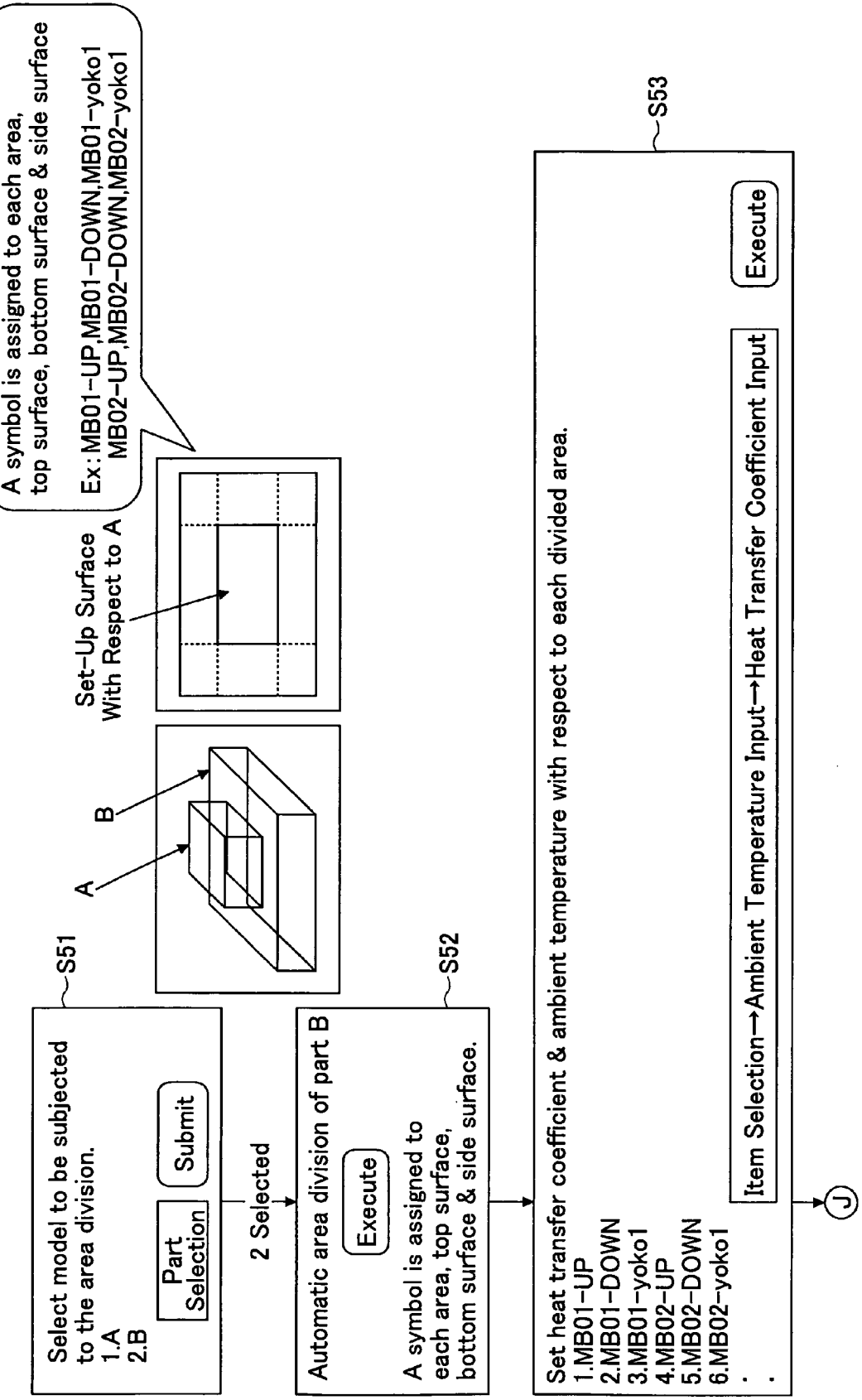

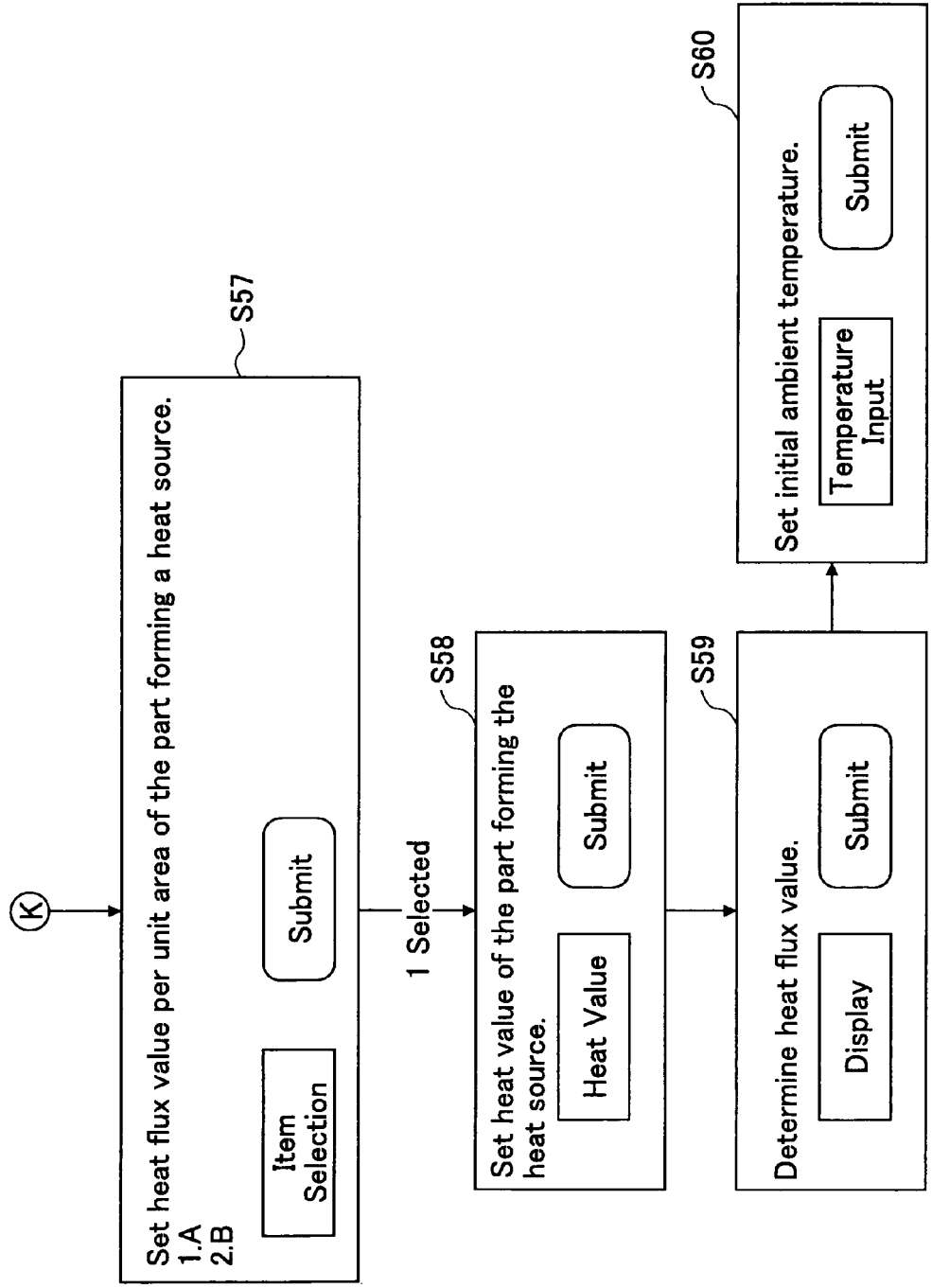

FIG.15

```
Select structure analysis file already created.
1. AAA
2. BBB
3. CCC

[Item Selection]  [Submit]

Select heat analysis file to be subjected to coupling analysis.
1. AAA-netsu
2. bbb-netsu
3. ccc-netsu

[Item Selection]  [Submit]

[Coupling Analysis Execute]
```

NUMERICAL ANALYSIS DATA CREATING METHOD AND APPARATUS, AND COMPUTER-READABLE PROGRAM

BACKGROUND OF THE INVENTION

1. Field of the Invention

The present invention generally relates to numerical analysis data creating methods and apparatuses and computer-readable programs, and more particularly to numerical analysis data creating method and apparatus which create numerical analysis data in a computer aided engineering (CAE) system or the like, and a computer-readable program for causing a computer to create the numerical analysis data by such a numerical analysis data creating method. The present invention also relates to a computer-readable storage medium which stores such a computer-readable program.

2. Description of the Related Art

When carrying out a numerical analysis, an analyzing mesh model is created from scratch using the CAE system or the like according to analyzing contents and design information such as design diagrams and computer aided design (CAD) data, even if a target, such as a similar apparatus, product, module or part, has been analyzed in the past. This is because, even when the target is a combination of various parts, the analysis data is created by regarding the target as an integral structure that is assembled using an adhesive agent, screws, rivets, welding and the like, and the analysis model is created again from scratch if a modification or change in shape is made in one of the constituent parts, so as to set the analysis condition. Therefore, even if a similar analyzing target exists, the analysis model and the analysis data are newly created, thereby requiring a relatively long time until the results are obtained.

Various analyzing methods have been proposed, such as those proposed in Japanese Laid-Open Patent Applications No. 2001-134783, No. 2003-119041, No. 11-66125, No. 2003-22288, No. 2001-265836, No. 9-138812 and No. 8-292974.

Hence, the analysis model and the analysis data are conventionally created for each analyzing target, and there was a problem in that it is difficult to shorten the time required to create the analysis data.

SUMMARY OF THE INVENTION

Accordingly, it is a general object of the present invention to provide a novel and useful numerical analysis data creating method and apparatus, and computer-readable program, in which the problem described above is suppressed.

Another and more specific object of the present invention is to provide a numerical analysis data creating method, a numerical analysis data creating apparatus, and a computer-readable program, which can shorten the time required to create the analysis data, by reusing the analysis data which has been obtained by analysis that has already been made.

Still another object of the present invention is to provide a numerical analysis data creating method for creating numerical analysis data that are obtained by analyzing an analyzing target, comprising a judging step judging whether or not to create the numerical analysis data of the analyzing target using data that have been stored in a database part; a searching step searching the database part based on information related to the analyzing target and displaying a search result, if the numerical analysis data of the analyzing target are to be created using the stored data; and a creating step creating and storing in the database part the numerical analysis data of the analyzing target by modifying usable data if necessary, when the usable data exist in the search result, wherein the data that have been stored in the database part include numerical analysis data, analysis model data, material characteristic data and attribute data with respect to targets that have been analyzed. According to the numerical analysis data creating method of the present invention, it is possible to shorten the time required to create the analysis data, by reusing the analysis data which has been obtained by analysis that has already been made.

A further object of the present invention is to provide a computer-readable program for causing a computer to create numerical analysis data by analyzing an analyzing target, comprising procedures causing the computer to execute each of the steps of the numerical analysis data creating method described above. According to the computer-readable program of the present invention, it is possible to shorten the time required to create the analysis data, by reusing the analysis data which has been obtained by analysis that has already been made.

Still another object of the present invention is to provide a numerical analysis data creating apparatus for creating numerical analysis data that are obtained by analyzing an analyzing target, comprising a judging part configured to judge whether or not to create the numerical analysis data of the analyzing target using data that have been stored in a database part; a searching part configured to search the database part based on information related to the analyzing target and displaying a search result, if the numerical analysis data of the analyzing target are to be created using the stored data; and a creating part configured to create and store in the database part the numerical analysis data of the analyzing target by modifying usable data if necessary, when the usable data exist in the search result, wherein the data that have been stored in the database part include numerical analysis data, analysis model data, material characteristic data and attribute data with respect to targets that have been analyzed. According to the numerical analysis data creating apparatus of the present invention, it is possible to shorten the time required to create the analysis data, by reusing the analysis data which has been obtained by analysis that has already been made.

Other objects and further features of the present invention will be apparent from the following detailed description when read in conjunction with the accompanying drawings.

BRIEF DESCRIPTION OF THE DRAWINGS

FIGS. 6A through 6C are flow charts for explaining an operation of a first analysis model creating part;

FIGS. 7A through 7C are flow charts for explaining the operation of the second analysis model creating part;

FIG. 10 is a diagram for explaining an operation of a contact and tie defining part;

FIGS. 14A through 14C are flow charts for explaining an operation of a heat analysis condition setting part; and FIG. 15 is a diagram for explaining an operation of a coupling analysis condition setting part.

DESCRIPTION OF THE PREFERRED EMBODIMENTS

Figure 1:
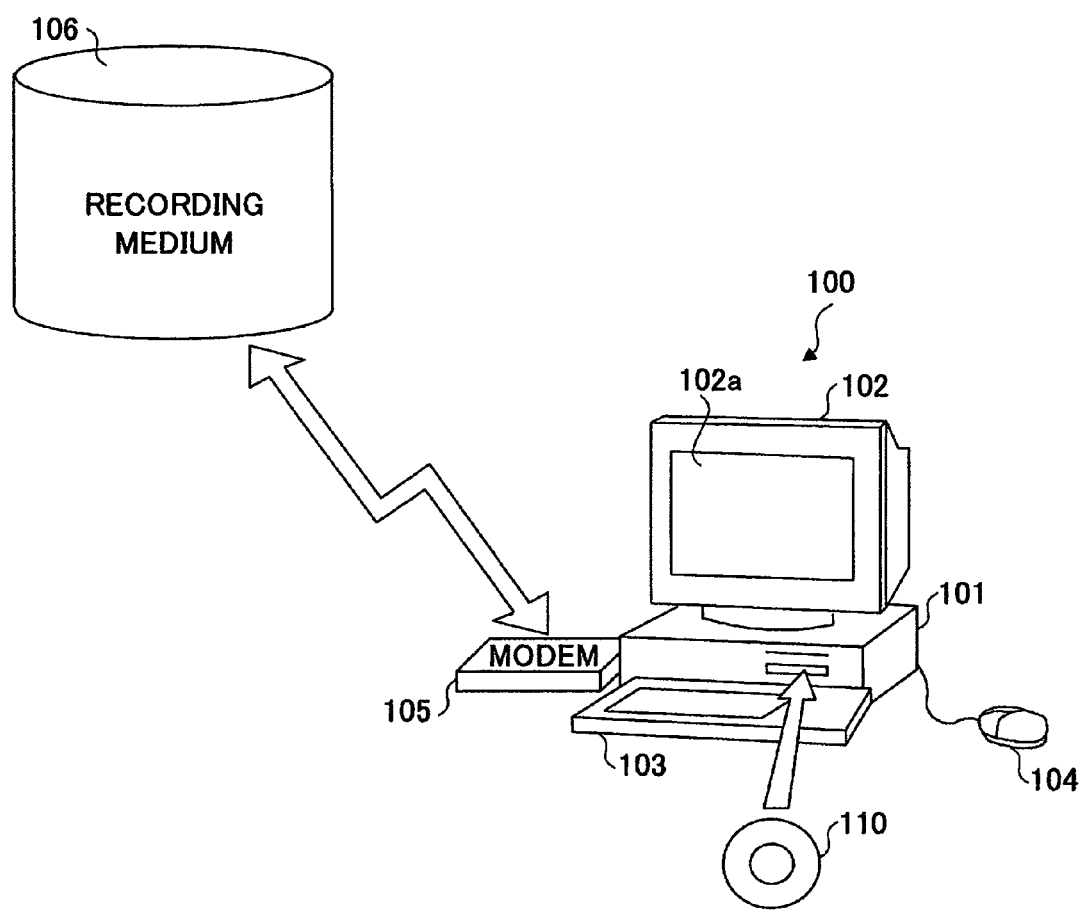
FIG. 1 is a perspective view showing a computer system applied with the present invention.

In the present invention, when a new analyzing target exists, the analysis data which has been obtained by analysis that has already been made is reused, and the analysis data for the new analyzing target is created by utilizing to the maximum the data which have already been obtained, such as an analysis model, material, mutual relationship condition, constraint condition, load condition, heat analysis condition (or heat analysis) and coupling analysis condition (or coupling analysis).

Accordingly, it is possible to shorten the time required to create the analysis data.

A description will now be given of embodiments of the numerical analysis data creating method and apparatus according to the present invention, and the computer-readable program and storage medium according to the present invention, by referring to the drawings.

An embodiment of the numerical analysis data creating apparatus according to the present invention employs an embodiment of the numerical analysis data creating method according to the present invention, an embodiment of the computer-readable program according to the present invention, and an embodiment of the computer-readable storage medium according to the present invention. FIG. 1 is a perspective view showing a computer system applied with the present invention in this embodiment.

A computer system 100 shown in FIG. 1 includes a main body part 101, a display 102, a keyboard 103, a mouse 104 and a modem 105. The main body part 101 includes a CPU, a disk drive and the like. The display 102 displays images on a display screen 102a in response to an instruction from the main body part 101. The keyboard 103 is used by a user to input various information to the computer system 100. The mouse 104 is used by the user to specify an arbitrary position on the display screen 102a of the display 102. The modem 105 makes access to an external database or the like and downloads programs and the like stored in another computer system.

The computer-readable program (CAD software or numerical analysis data creating software) of this embodiment for making the computer system 100 have a CAD function or at least a numerical analysis data creating function of the CAD function, which is stored in a portable recording medium such as a disk 110 or, downloaded from a recording medium 106 of another computer system using a communication unit such as the modem 105, is input to the computer system 100 and compiled therein. The program of this embodiment operates the computer system 100 (that is, a CPU 201 which will be described later) as the numerical analysis data creating apparatus of this embodiment having the CAD function. The computer-readable storage medium of this embodiment is formed by a computer-readable recording medium, such as the disk 110, that stores the program of this embodiment. The recording medium forming the computer-readable storage medium of this embodiment is not limited to portable recording media such as the disk 110, IC card memories, magnetic disks including floppy (registered trademark) disks, magneto-optical disks and CD-ROMs. The recording medium forming the computer-readable storage medium of this embodiment includes various recording media accessible by the computer system that is connected via the communication unit or communication means such as the modem 105 and the LAN.

Figure 2:
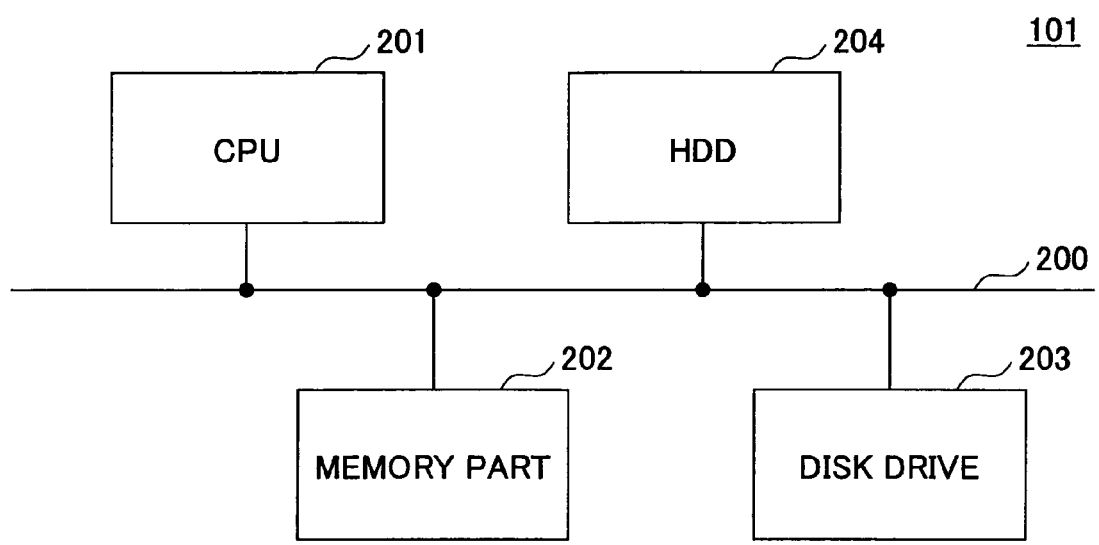
FIG. 2 is a system lock diagram for explaining a structure of an important part within a main body part of the computer system.

FIG. 2 is a system block diagram showing a structure of an important part within the main body part 101 of the computer system 100 shown in FIG. 1. In FIG. 2, the main body part 101 includes the CPU 201, a memory part 202, a disk drive 203 and a hard disk drive (HDD) 204 that are connected via a bus 200. The memory part 202 includes a RAM, a ROM and the like. The disk drive 203 is provided for the disk 110. In this embodiment, the display 102, the keyboard 103 and the mouse 104 are also connected to the CPU 201 via the bus 200, but it is of course possible to connect the display 102, the keyboard 103 and the mouse 104 directly to the CPU 201. In addition, the display 102 may be connected to the CPU 201 via a known graphic interface (not shown) that processes input and output image data.

Of course, the structure of the computer system 100 is not limited to the structure shown in FIGS. 1 and 2, and other known structures may be used instead.

Figure 3:
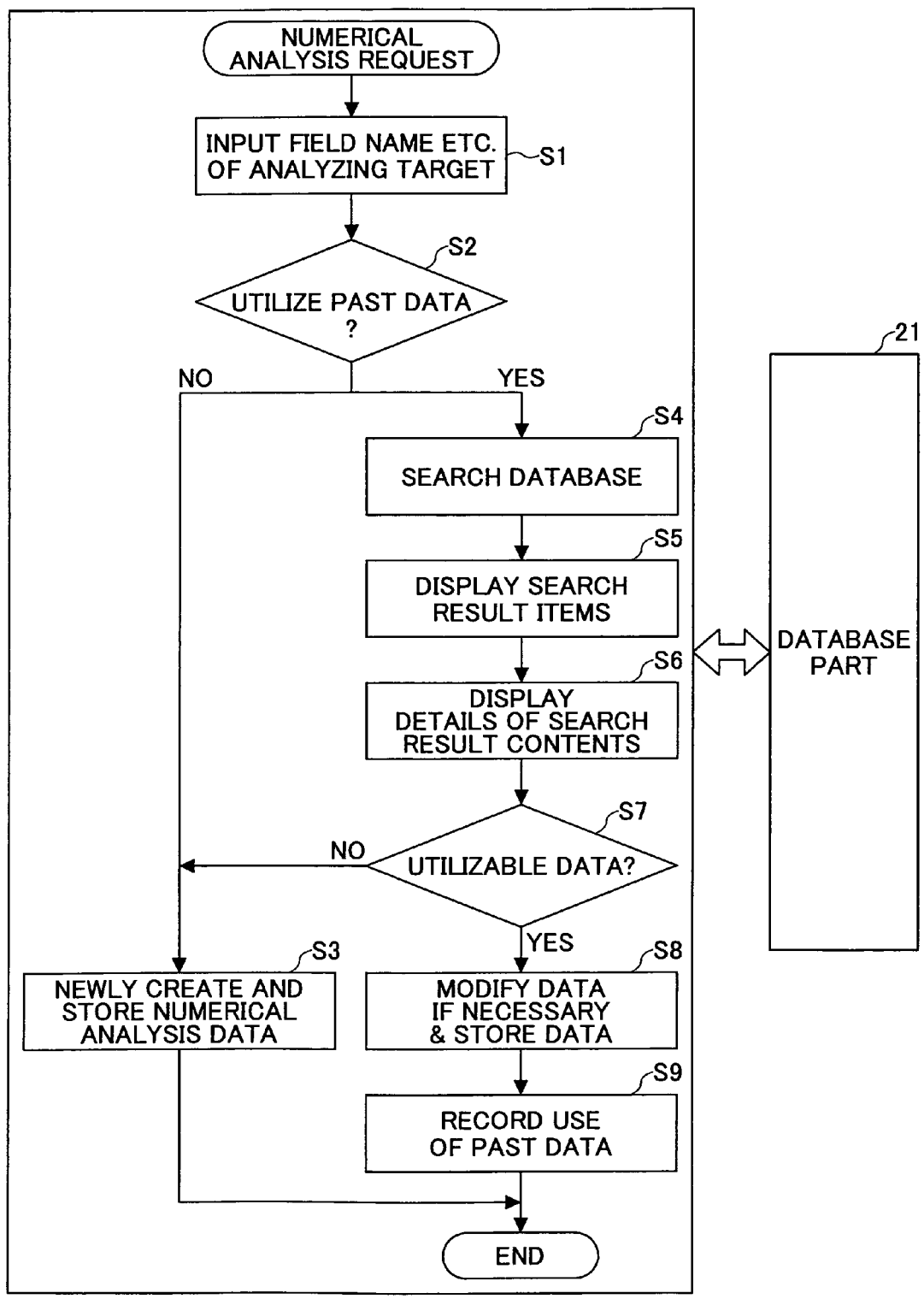
FIG. 3 is a flow chart for explaining an operation of an embodiment of a numerical analysis data creating apparatus.

FIG. 3 is a flow chart for explaining an operation of this embodiment of the numerical analysis data creating apparatus. The processes of steps S1 through S9 correspond to procedures of the computer-readable program, and are executed by the CPU 201, that is, corresponding parts or means of the computer system 100, with respect to the analyzing target such as an apparatus, unit or part.

The process shown in FIG. 3 is started in response to a numerical analysis request. The numerical analysis request may be input by the user from the keyboard 103 or the like or, issued from the CAD software or the like of the computer system 100 or, issued from an external computer system or the like. The step S1 inputs information of a field name of enterprise, unit name, part name and the like related to the analyzing target. The information input in the step S1 may be input by the user from the keyboard 103 or the like or, read from the memory part 202 or the like based on an instruction from the keyboard 103 or the like. The step S2 decides whether or not to utilize past data, as the numerical analysis data requested by the numerical data analysis request. If the decision result in the step S2 is NO, the step S3 newly creates a numerical analysis data and stores the numerical analysis data in a database part 21 which will be described later, and the process ends. More particularly, the step S3 creates an analysis model data, and creates the numerical analysis data by adding thereto material characteristic data and attribute information data, so as to store (or register) the numerical analysis data in the database part 21 and to also store the analysis model data, the material characteristic data and the attribute information data in the database part 21. The database part 21 may be formed by a storage part such as the memory part 202 within the computer system 100 and/or a storage part of a computer system other than the computer system 100. For example, the numerical analysis data, the analysis model data, the material characteristic data and the attribute information data are stored in separate databases of the database part 21.

On the other hand, if the decision result in the step S2 becomes YES, the step S4 searches the numerical analysis data, the analysis model data and the material characteristic data stored in the database part 21, based on the information input in the step S1 and the attribute information data stored in the database part 21. The step S5 displays on the display screen 102a of the display search result items that are found by the search. The step S6 displays on the display screen 102a details of search result contents corresponding to a search result item that is specified, from among the displayed search result items, by the user from the mouse 104 or the like. For example, if the specified search result item is the analysis model, this analysis model is displayed on the display screen 102a, and corresponding text data are otherwise displayed on the display screen 102a. The step S7 decides whether or not the displayed details of the search result contents include utilizable data, and the process advances to the step S3 described above if the decision result in the step S7 is NO.

If the decision result in the step S7 becomes YES, the step S8 copies the details of the utilizable search result contents and interactively modifies the details, if necessary, before storing the details in the database part 21. For example, if the details of the utilizable search result contents is the analysis model, the analysis model data that is copied is interactively modified, if necessary, before being stored in the database part 21, and in addition, the numerical analysis data obtained by executing an analysis using the analysis model data and the corresponding attribute information data are stored in the database part 21. If the user has expert knowledge and the details of the utilizable search result contents are the numerical analysis data, for example, the user may interactively and directly modify the numerical analysis data, if necessary, and store the modified numerical analysis data and the corresponding attribute information data in the database part 21. The step S9 stores the use of the past data, as a log, in the storage part such as the memory part 202 within the computer system 100 and/or the database part 21, and the process ends.

Figure 4:
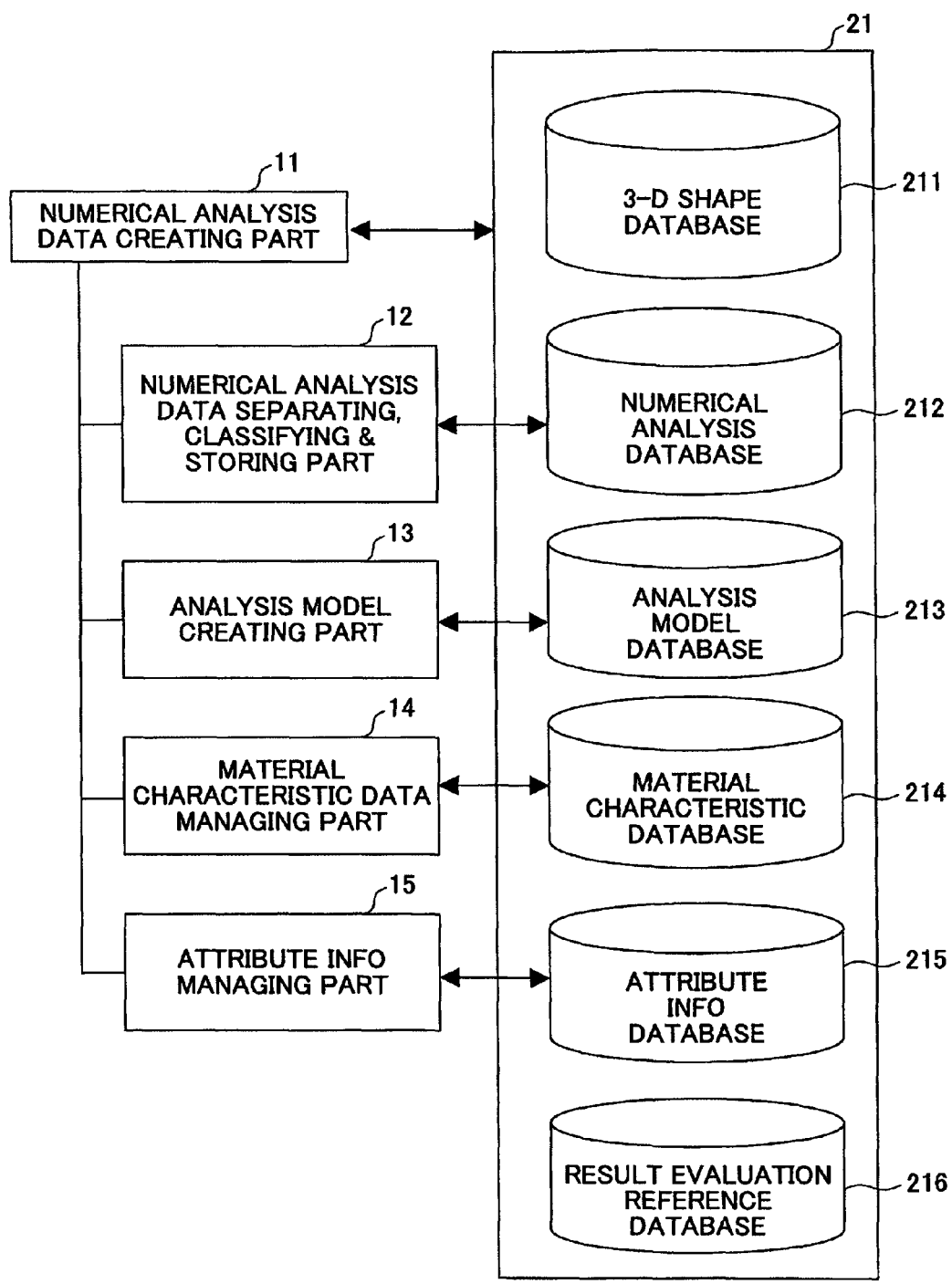
FIG. 4 is a functional block diagram showing the numerical analysis data creating apparatus.

FIG. 4 is a functional block diagram showing the numerical analysis data creating apparatus of this embodiment. The numerical analysis data creating apparatus shown in FIG. 4 has a numerical analysis data creating part 11, a numerical analysis data separating, classifying and storing part 12, an analysis model creating part 13, a material characteristic data managing part 14, and an attribute information managing part 15. The database part 21 in its entirety may be provided within the numerical analysis data creating apparatus or, within an external apparatus. Alternatively, the database part 21 may partially be provided within the numerical analysis data creating apparatus and within the external apparatus. The database part 21 includes a three-dimensional shape database 211, a numerical analysis database 212, an analysis model database 213, a material characteristic database 214, an attribute information database 215, and a result evaluation reference database 216.

The three-dimensional shape database 211 stores the three-dimensional shape data of apparatuses and parts including the target. The three-dimensional shape data may be input from an input part such as the keyboard 103 of the computer system 100 and stored in the three-dimensional shape database 211 or, downloaded from another computer system and stored in the three-dimensional shape database 211. The numerical analysis database 212 stores the numerical analysis data of the apparatuses and parts including the target. The analysis model database 213 stores the analysis model data of the apparatuses and parts including the target. The material characteristic database 214 stores the material characteristic data of the apparatuses and parts. The attribute information database 215 stores: the field name of enterprise, the product name, the unit (or module) name, the part name and the material name of the apparatuses and parts including the target; the storage address of the three-dimensional shape data within the three-dimensional shape database 211; the storage address of the numerical analysis data within the numerical analysis database 212; the storage address of the analysis model data within the analysis model database 213; the storage address of the material characteristic data within the material characteristic database 214; and the storage addresses of the mutual relationship condition (or data) indicating the contact, tie (or connection) and the like of other apparatuses and parts, the constraint condition (or data), the load condition (or data) and the like within the attribute information database 215; as the attribute information in the form of a tree structure.

The numerical analysis data creating part 11 newly creates the numerical analysis data by the process shown in FIG. 3 or, creates the numerical analysis data by modifying the past data if necessary. The numerical analysis data separating, classifying and storing part 12 separates and classifies the created numerical analysis data for each analyzing information type, such as structure information, heat information and coupling information which will be described later, and stores the separated and classified numerical analysis data in the numerical analysis database 212. More particularly, the numerical analysis data separating, classifying and storing part 12 stores the numerical analysis data that are separated and classified for each analyzing information type into the numerical database 212, at a stage when the numerical analysis is finished or when the numerical analysis data is judged as being acceptable (or valid) by executing the checking and numerical analysis of the numerical analysis data.

The analysis model creating part 13 creates the analysis model of the target, and stores the analysis model data in the analysis model database 213. The analysis model data of the apparatuses and parts including the target are stored in the analysis model database 213, by including forming node coordinate value data and element forming node data, for a each element set forming the target. If the analysis model is created for each of the apparatuses and parts including the target and an analysis model creating procedure exists as data, this analysis model creating procedure is also stored in the analysis model database 213. In a case where a meshing is carried out based on the three-dimensional CAD model stored in the three-dimensional shape database 211, the storage address of this three-dimensional CAD model within the three-dimensional shape database 211 is also stored in the analysis model database 213.

The material characteristic data managing part 14 stores the material characteristic data indicating the characteristics of the materials forming the apparatuses and parts including the target in the material characteristic database 214, and manages the material characteristic data. The attribute information managing part 15 stores the attribute information of the apparatuses and parts including the target in the attribute information database 215, and manages the attribute information.

The result evaluation reference data, used as a reference when evaluating the numerical analysis data created by the numerical analysis data creating part 11, are stored in the result evaluation reference database 216.

Therefore, by storing and managing the numerical analysis data of the apparatuses and parts including the target in the database for each analyzing information type, and also storing and managing the attribute information in the database, it is possible, when making a numerical analysis of the target, to easily search the numerical analysis data of a similar (or closest) target from the past numerical analysis data and to modify (or edit) the searched numerical analysis data, if necessary. Hence, it is possible to shorten the time required to create the numerical analysis data of the target.

When analyzing a new target, at least one information of the new target, such as the field name of enterprise, the product name, the unit (or module) name, the part name and the material name of the new target, is used as a keyword to search the attribute information database 215 in order to judge whether or not the data with respect to the new target already exist or, the data with respect to a similar target exist. If the product name or the unit (or module) name of the new target is the same as that of the existing (or similar) target, three-dimensional shape data of the existing target are read from the three-dimensional shape database 211 or, the analysis model data of the existing target are read from the analysis model database 213, and displayed on the display 102 for the purpose of confirming the dimensions. If the existing analysis model data is utilizable by changing the dimensions, the existing analysis model data are modified before carrying out the meshing. The material is confirmed in a similar manner, and if the material needs to be changed, a search is made in the material characteristic database 214 and the material characteristic data indicating the new material name, characteristic and the like are given to the target. If the combination of the contact and coupling among the apparatuses and parts needs to be changed or, if a new combination is needed, the mutual relationship condition, the constraint condition and the load condition specifying the surfaces and the positioning (or alignment) of the target are given to the target interactively on the display screen 102a. The coupling and contact definition data are created on the numerical analysis data, depending on the mutual relationship condition, the constraint condition and the load condition that are given. Furthermore, the heat analysis condition and the coupling analysis condition which will be described later are given to the target, if necessary. The numerical analysis data that are created in this manner are stored in the numerical analysis database 212.

Accordingly, by registering various analysis models in the database part 21 that is accessible from a plurality of computer systems (or users), the various analysis models may be shared in common among the users, to thereby shorten the time required to create the analysis models. In addition, even if the user has no expert knowledge of contact analysis and coupling analysis, for example, the user can easily analyze the target and use the numerical analysis data for inspection, verification and the like of the mechanisms of the targets having various structures. Moreover, by forming the numerical analysis data creating part 11 so that the data is modifiable interactively, it is possible to smoothly create the numerical analysis data.

Figure 5:
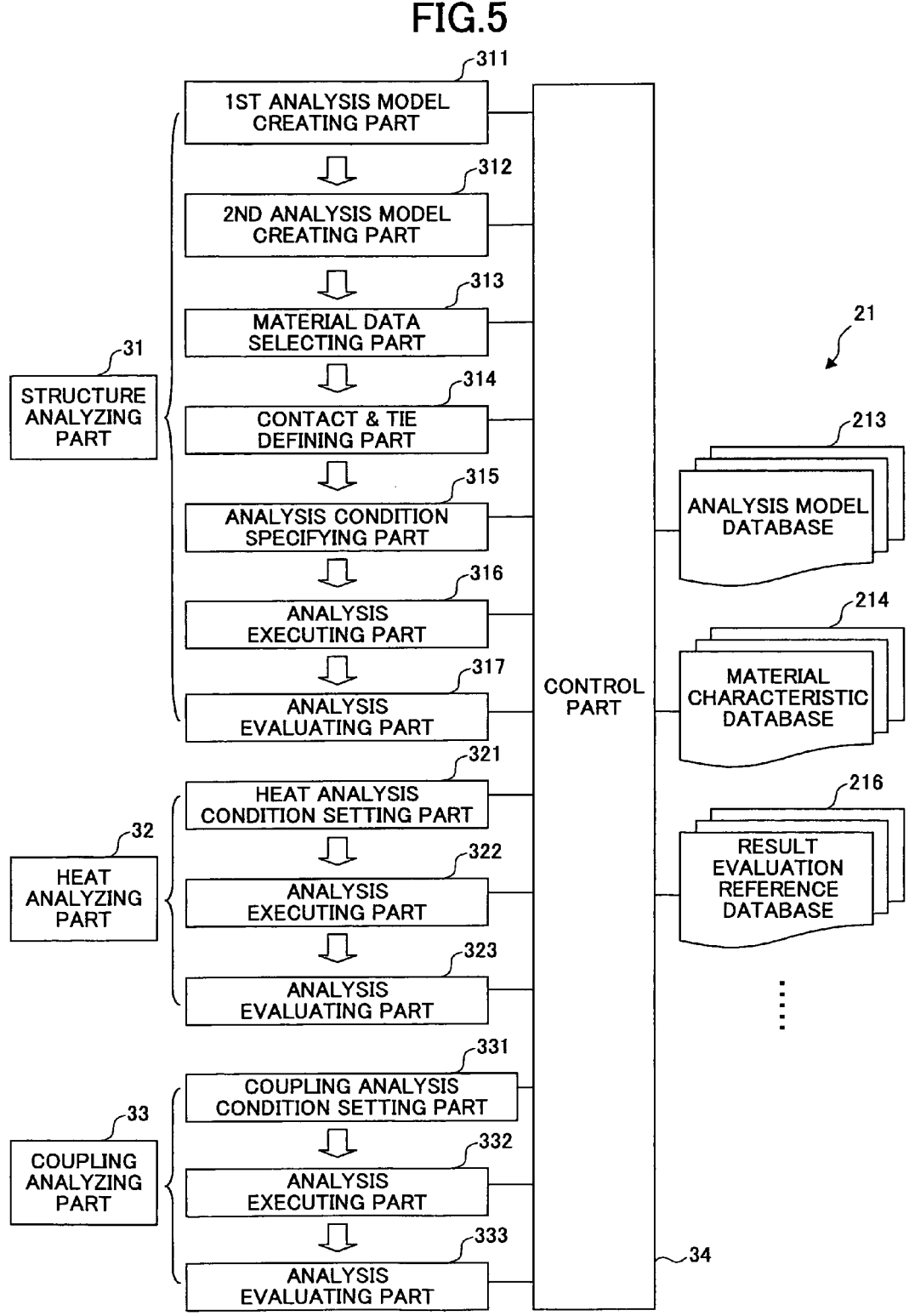
FIG. 5 is a functional block diagram showing a numerical analysis data creating part.

FIG. 5 is a functional block diagram showing the numerical analysis data creating part 11. As shown in FIG. 5, the numerical analysis data creating part 11 has a structure analyzing part 31, a heat analyzing part 32, a coupling analyzing part 33, and a control part 34. The structure analyzing part 31 includes a first analysis model creating part 311, a second analysis model creating part 312, a material data selecting part 313, a contact and coupling defining part 314, an analysis condition specifying part 315, an analysis executing part 316, and an analysis evaluating part 317. The heat analyzing part 32 includes a heat analysis condition setting part 321, an analysis executing part 322, and an analysis evaluating part 323. The coupling analyzing part 33 includes a coupling analysis condition setting part 331, an analysis executing part 332, and an analysis evaluating part 333.

The structure analyzing part 31, the heat analyzing part 32 and the coupling analyzing part 33 are connected to database part 21 via the control part 34 which forms the numerical analysis data separating, classifying and storing part 12, the analysis mode creating part 13, the material characteristic data managing part 14 and the attribute information managing part 15. FIG. 5 shows a case where the numerical analysis data (that is, the analysis result) created by the numerical analysis data creating part 11 are evaluated, and for this reason, the result evaluation reference database 216 is included in the database part 21. In addition, each of the databases 213, 214 and 216 is made up of three database portions respectively corresponding to the structure analyzing part 31, the heat analyzing part 32 and the coupling analyzing part 33. In FIG. 5, the illustration of the databases of the database part 21 other than those shown will be omitted for the sake of convenience.

First, a description will be given of the structure analyzing part 31.

FIGS. 6A through 7C are flow charts for explaining an operation of the first analysis model creating part 311 of the structure analyzing part 31. The first analysis model creating part 311 creates the analysis model for the case where the analyzing target is a single apparatus or part. For the sake of convenience, FIGS. 6A through 6C, FIGS. 7A through 7C and FIGS. 14A through 14C which will be described later show screens that are displayed on the display screen 102a of the display 102 in each of the steps. In addition, it is assumed for the sake of convenience that the selection of a selection item in each step is made by selecting an "item selection" button, then selecting an "item number" of the selection item, and thereafter selecting a "submit (or confirm)" button.

In FIG. 6A, a step S11 specifies whether to create the entire model (1/1 size) of the analyzing target or a model in 1/2 or 1/4 size using symmetric boundary condition. A step S12 selects the field of the target from fields that are registered in advance. For example, if the item number "1" for the 1/1 size is selected in the step S11, the field is selected from "server-related systems", "mobile-related equipments", "HDD-related systems" and "others". A step S13 selects a category of the target from categories that are registered in advance. If the item number "1" for the server-related system is selected in the step S12, the category is selected from "substrate", "chip", "under-filler" and the like. It is assumed for the sake of convenience that the item number "2" for the chip is selected as the category. A step S14 selects whether to newly create an analysis model or, to search the database part 21 and utilize an analysis model which matches or approximately matches the condition. It is assumed for the sake of convenience that the item number "2" for the chip is selected in the step S13. The process advances to a step S15 if the item number "1" for newly creating the analysis model is selected in the step S14, and the process advances to a step S21 which will be described later if the item number "2" for searching the database and utilizing the analysis model which matches or approximately matches the condition (hereinafter simply referred to as a database search).

The step S15 displays a standard analysis model and dimension input items of the target corresponding to the category selected in the step S13. For example, the standard analysis model of the target is a parallel hexahedron having a horizontal dimension "a", a vertical dimension "b" and a height (or thickness) dimension "t" as shown on the left side of the step S15, and the input items of these dimensions "a", "b" and "t" are also displayed on the display screen 102a together with the standard analysis model. Accordingly, the analysis model is created when the user inputs the dimensions "a", "b" and "t". A step S16 shown in FIG. 6B determines whether or not to read (or utilize) actually measured data, if any, such as the warp, undulation, surface temperature and the like of the target. If the item number "1" for YES is selected in the step S16, the shape of the analysis model created in the step S15 is modified based on the actually measured data.

A step 17 selects an analyzing mesh type to be created and inputs the mesh size. It is assumed for the sake of convenience that the tetra mesh of the item number "1" and the hexahedron mesh of the item number "2" are selectable as the mesh type, and that the default size of the mesh size is size "1".

A step S18 determines whether or not to store the created analysis model in the analysis model database 213. The item number "1" for YES is selected and a file name is specified when storing the created analysis model in the analysis model database 213. If the item number "2" for NO is selected, the created analysis model is not stored in the analysis model database 213.

Figure 6B:
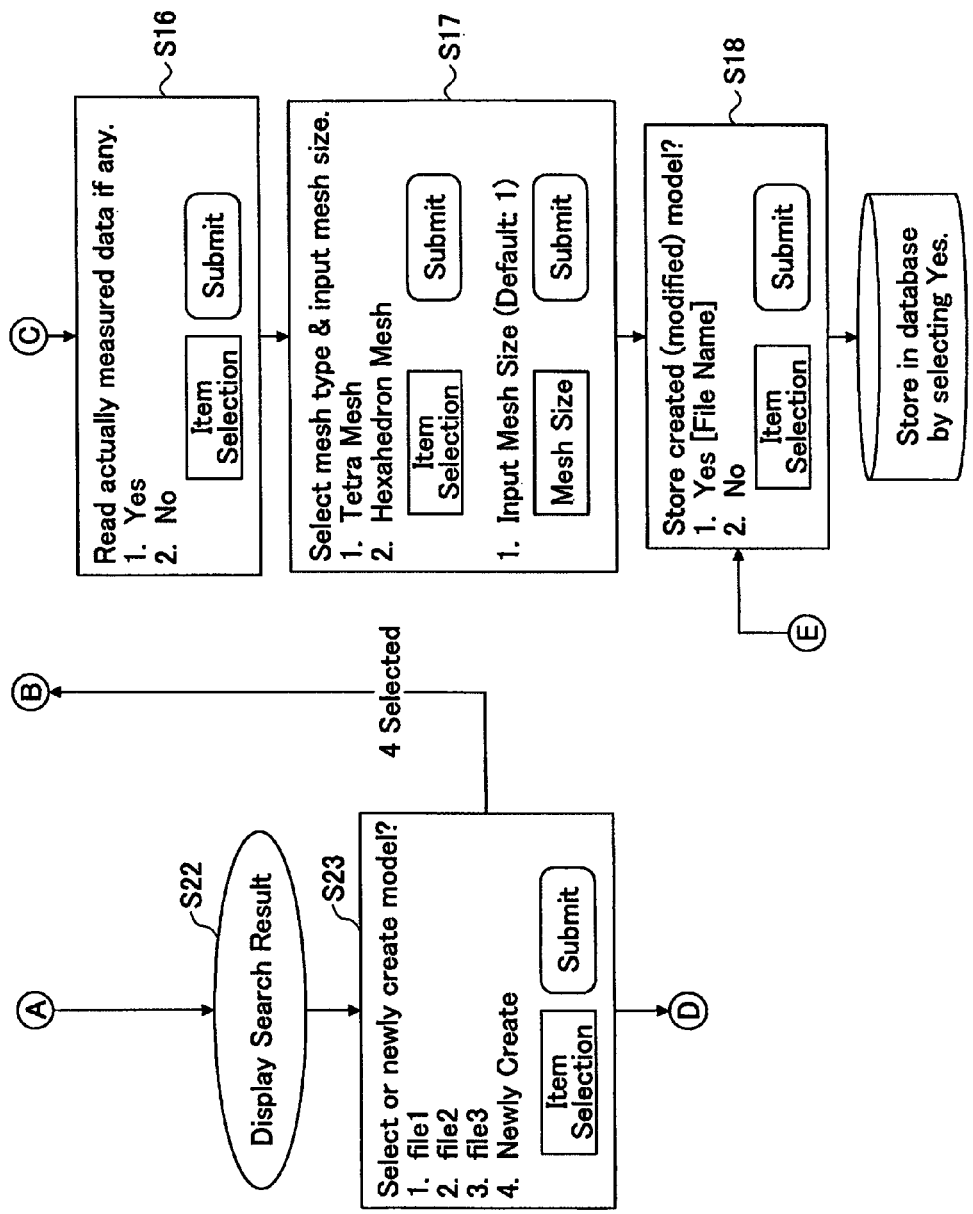

On the other hand, if the database search of the item number "2" is selected in the step S14, the step S21 obtains from the analysis model database 213 the analysis models of the field selected in the step S12 and the category selected in the step S13, and narrows (or refines) the obtained analysis models based on the dimensions "a", "b" and "t" and the mesh type that are input by the user. The narrowing of the obtained analysis models is carried out by selecting a "search execute" button after inputting the dimensions "a", "b" and "t" and the mesh type. In a case where the analysis models of the field selected in the step S12 and/or the category selected in the step S13 cannot be obtained from the analysis model database 213, a step S22 shown in FIG. 6B displays the file names of the analysis models of similar fields and/or similar categories, in separate items, so as to urge the user to select the file names. Hence, a step S23 displays the file names of the analysis models that are obtained from the analysis model database 213 and narrowed or, the selected file names of the analysis models of the similar field and/or similar category, so as to urge the user to select a file name. FIG. 6B shows a case where the item number "1" specifies a file name file1, the item number "2" specifies a file name file2, the item number "3" specifies a file name file3, and the item number "4" specifies newly creating the analysis model. If the item number "4" that specifies newly creating the analysis model is selected in the step S23, the process returns to the step S15 described above, and the analysis model is newly created.

If one of the item numbers "1" through "3" is selected in the step S23, a step S24 shown in FIG. 6C modifies the selected analysis model by determining whether or not to modify the analysis model of the selected file name, determining the reading of the model size, dimensions and actually measured data, and determining the changing contents related to each of the items such as the mesh type, based on the selections made by the user. As shown on the left side of the step S24, the selected analysis model and the input items for the dimensions "a", "b" and "t" thereof are also displayed on the display screen 102a, and thus, the user can interactively modify the selected analysis model according to the needs while confirming on the display screen 102a. After the step S24, the process advances to the step S18 described above.

Figure 7C:
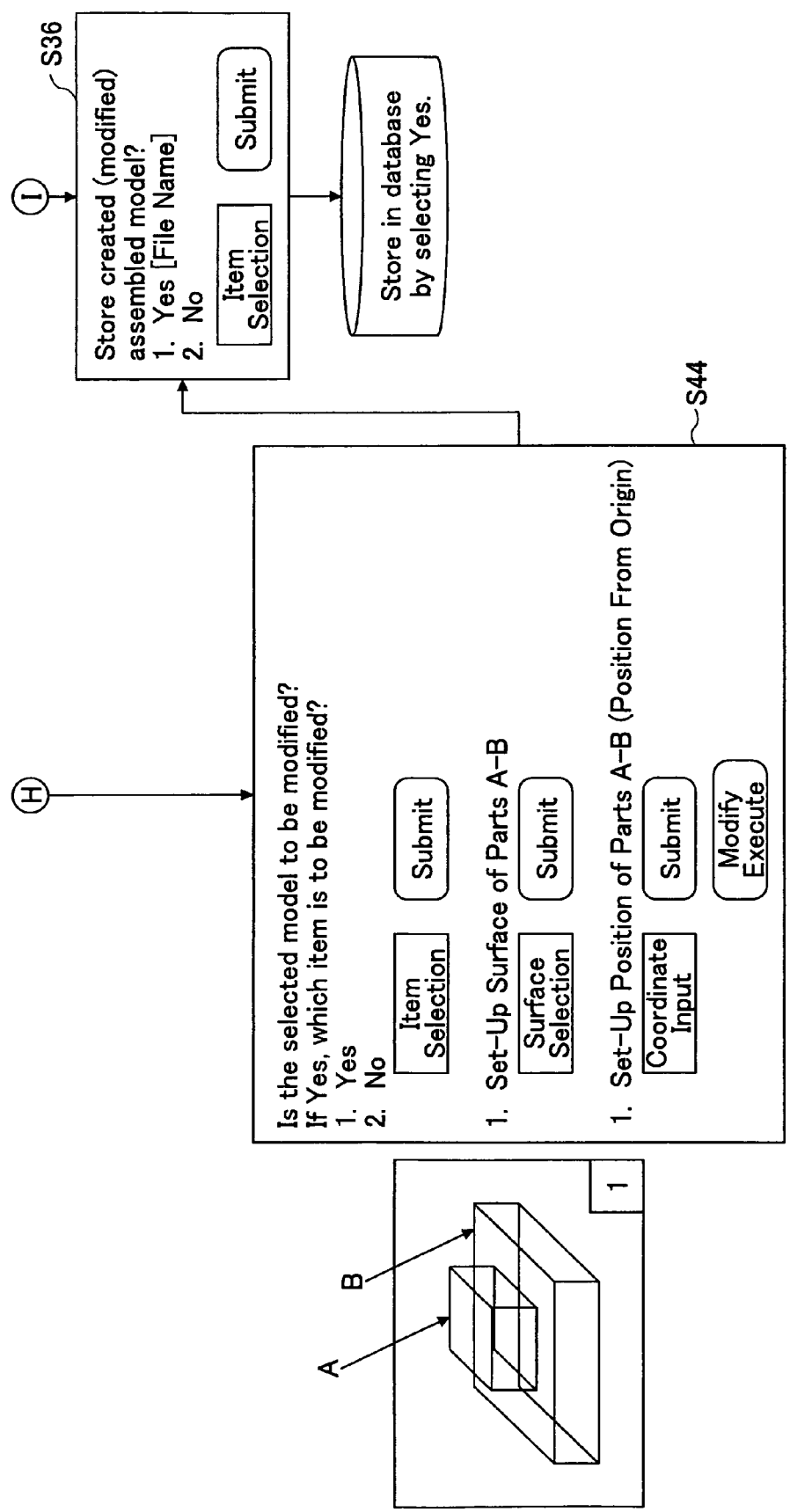

FIGS. 7A through 7C are flow charts for explaining the operation of the second analysis model creating part 312 of the structure analyzing part 31. The second analysis model creating part 312 creates the analysis model for the case where the analyzing target is made up of a combination of a plurality of apparatuses or parts. In FIG. 7A, steps S31 through S34 are the same as the steps S11 through S14 shown in FIG. 6A, and a description thereof will be omitted. It is assumed for the sake of convenience that the item number "1" for the substrate is selected in the step S33. The process advances to a step S35 if the item number "1" for newly creating the analysis model is selected in the step S34, and the process advances to a step S41 which will be described later if the item number "2" for the database search is selected in the step S34.

The step S35 shown in FIG. 7B selects the category of the apparatus or part that is to be combined (or assembled) with a substrate B which is selected in the step S33, from the categories that are registered in advance, and inputs set-up surfaces and set-up positions of the parts B and A that are to be combined. In this case, it is assumed for the sake of convenience that the user selects the item number "1" for the chip A, inputs the top surface of the substrate B and the bottom surface of the chip A that contact each other as the set-up surfaces, and inputs the set-up positions of the substrate B and the chip A relative to the origin so that centers of the substrate B and the chip A match. Accordingly, a standard analysis model that is made up of the combination of the substrate B and the chip A is displayed on the display screen 102a as shown on the left side of the step S35, for example, and the user can thus interactively modify the shape of the standard analysis model (or substrate B), select the mesh type and input the mesh size, while confirming on the display screen 102a.

A step S36 shown in FIG. 7C decides whether or not to store the created analysis model in the analysis model database 213. When storing the created analysis model in the analysis model database 213, the item number "1" for YES is selected and the file name is specified. On the other hand, when the item number "2" for NO is selected, the created analysis model is not stored in the analysis model database 213.

On the other hand, if the item number "2" for the database search is selected in the step S34, the step S41 obtains from the analysis model database 213 the analysis models that have been combined (or assembled) and including the analysis model (substrate B) of the field selected in the step S32 and the category selected in the step S33, and narrows the analysis models that have been combined based on the dimensions "a", "b" and "t" of the substrate B and the mesh type that are input by the user. The narrowing of the analysis models that have been combined is carried out when a "search execute" button is selected after inputting the dimensions "a", "b" and "t" of the substrate B and the mesh type. In a case where the analysis models that have been combined and including the analysis model of the field selected in the step S32 and/or the category selected in the step S33 cannot be obtained from the analysis model database 213, a step S42 shown in FIG. 7B displays the file names of the analysis models that have been combined and including the analysis model of a similar field and/or a similar category, in separate items, so as to urge the user to select the file names. Hence, a step S43 displays the file names of the analysis models that have been combined and are obtained from the analysis model database 213 and narrowed or, the selected file names of the analysis models that have been combined and including the analysis model of the similar field and/or similar category, so as to urge the user to select a file name. FIG. 7B shows a case where the item number "1" specifies a file name file1, the item number "2" specifies a file name file2, the item number "3" specifies a file name file3, and the item number "4" specifies newly creating the analysis model. If the item number "4" that specifies newly creating the analysis model is selected in the step S43, the process returns to the step S35 described above, and the analysis model is newly created.

If one of the item numbers "1" through "3" is selected in the step S43, a step S44 shown in FIG. 7C modifies the selected analysis model that has been combined, by determining whether or not to modify the analysis model of the selected file name that has been combined, and determining the changing contents related to the set-up surfaces of the parts B and A that are combined and the set-up positions of the parts B and A that are combined, based on the selections made by the user. As shown on the left side of the step S44, the selected analysis model that has been combined is displayed on the display screen 102a, and thus, the user can interactively modify the selected analysis model that has been combined according to the needs while confirming on the display screen 102a. After the step S44, the process advances to the step S36 described above.

Figure 8:
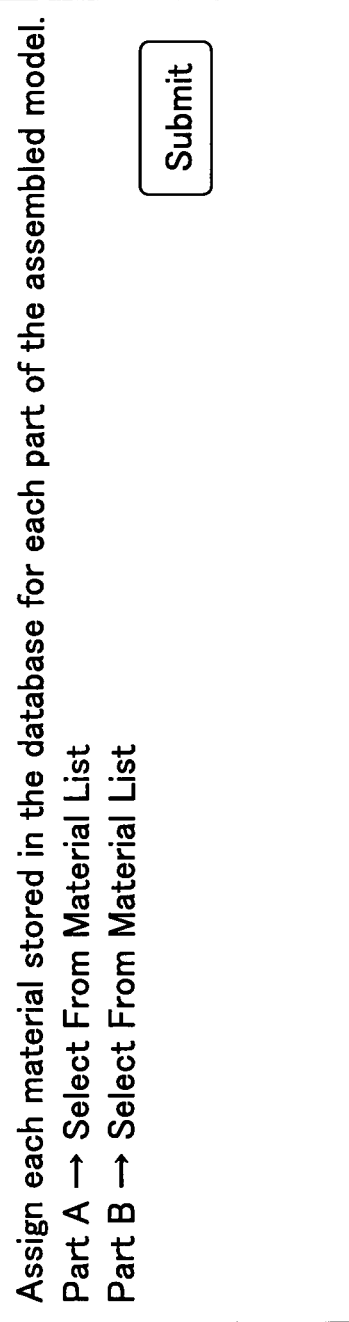
FIG. 8 is a diagram for explaining an operation of a material data selecting part.
Figure 9:
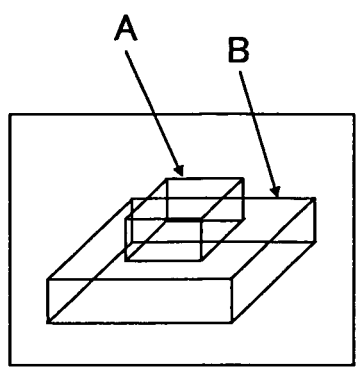
FIG. 9 is a diagram for explaining selection of material data.

FIG. 8 is a diagram for explaining an operation of the material data selecting part 313 of the structure analyzing part 31, and FIG. 9 is a diagram for explaining selection of material data. For example, in a state where the analysis model that has been combined with the parts B and A shown in FIG. 9 is created and displayed on the display screen 102a of the display 102, the material data selecting part 313 further displays a screen shown in FIG. 8 on the display screen 102a so as to urge the user to select the materials for each of the parts A and B. With respect to each of the parts A and B, the materials in a material list (or property list) read from the material characteristic database 214 are interactively selectable by the user while confirming the analysis model shown in FIG. 9 on the display screen 102a, and the material for each of the parts A and B is selected by selecting one material from the material list and selecting a "submit" button.

Figure 11A:
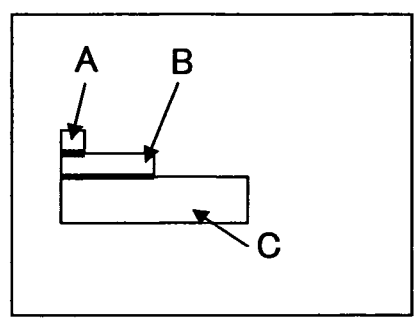
FIGS. 11A and 11B are diagrams for explaining a contact definition and a tie definition.
Figure 11B:
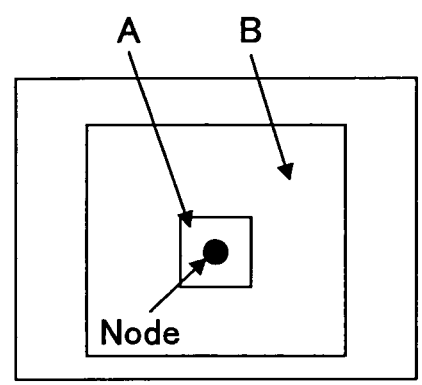

FIG. 10 is a diagram for explaining an operation of the contact and tie defining part 314 of the structure analyzing part 31, and FIGS. 11A and 11B are diagrams for explaining the contact definition and the tie definition. For example, the contact and tie defining part 314 displays a screen shown in FIG. 10 on the display screen 102a of the display 102, so as to urge the user to select the contact definition or the tie definition. When the contact definition is selected, a cross sectional view of the analysis model shown in FIG. 11A is further displayed on the display screen 102a, and the contact surface between the parts A and B and the contact surface between the parts B and C, that are highlighted (indicated by bold lines in FIG. 11A), are interactively selectable by the user while confirming on the cross sectional view displayed on the display screen 102a. On the other hand, when the tie definition (or connection definition) is selected, a top perspective view of the analysis model shown in FIG. 11B is further displayed on the display screen 102a, and the tie between the parts A and B and the tie between the parts B and C, that are highlighted (indicated by bold lines in FIG. 11B), are interactively selectable by the user while confirming on the top perspective view displayed on the display screen 102a. In this particular case, the tie between the parts A and B and the tie between the parts B and C can be selected by selecting a node on the contacting surface. The tie between the parts A and B, for example, includes a tie formed by an adhesive agent, a tie formed by welding and the like, and the method of forming the tie is not limited to a particular method.

Figure 12:
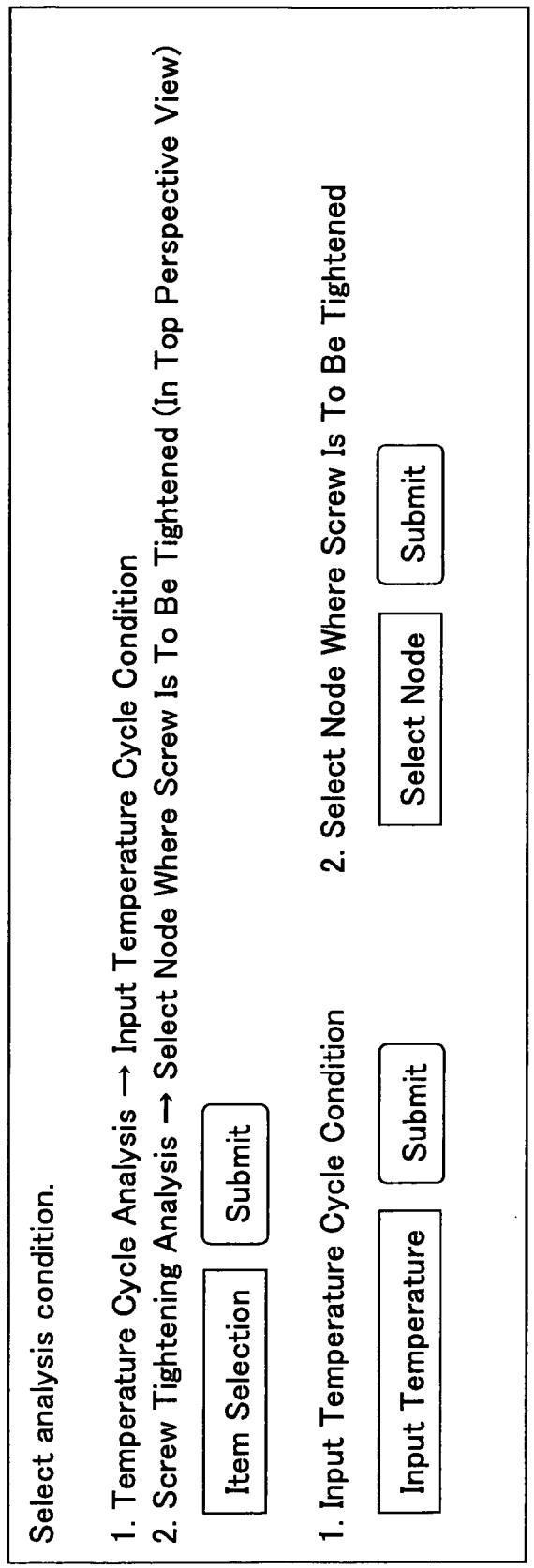
FIG. 12 is a diagram for explaining an operation of an analysis condition specifying part.
Figure 13:
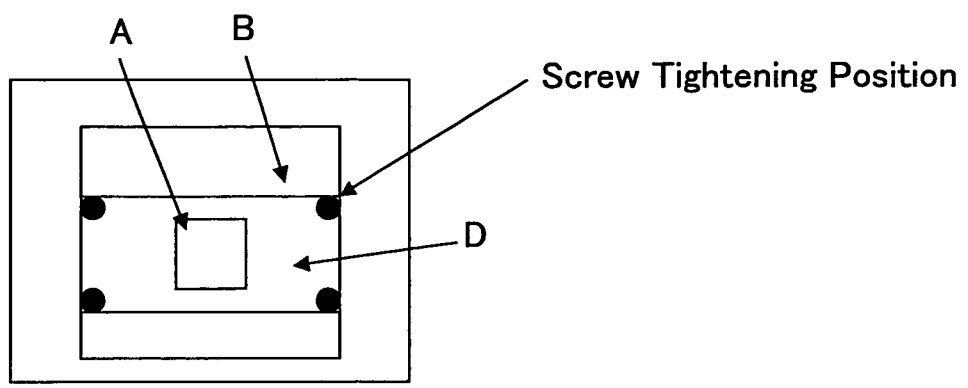
FIG. 13 is a diagram for explaining a screw tightening analysis.

FIG. 12 is a diagram for explaining an operation of the analysis condition specifying part 315 of the structure analyzing part 31, and FIG. 13 is a diagram for explaining a screw tightening analysis. For example, the analysis condition specifying part 315 displays a screen shown in FIG. 12 on the display screen 102a of the display 102, so as to urge the user to select the analysis condition. FIG. 12 shows a case where, as the analysis condition, the temperature cycle is selectable as the load condition and the screwing tightening position is selectable as the constraint condition. When the item "1" for the temperature cycle analysis is selected as the analysis condition, the user is urged to input the temperature cycle that is indicated by the relationship of the temperature change and the time, for example, and the user inputs the temperature cycle. When the item "2" for the screw tightening analysis is selected as the analysis condition, a top perspective view of the analysis model shown in FIG. 13 or the like is further displayed on the display screen 102a, and the screw tightening positions that are highlighted (indicated by bold dots in FIG. 13) are interactively selectable by the user while confirming on the top perspective view displayed on the display screen 102a.

The analysis condition specified by the analysis condition specifying part 315 is of course not limited to the temperature cycle and the screw tightening position described above. For example, it is possible to specify the sequence in which the load conditions, such as the pressure, weight (or load), temperature and heat value (or heat generation rate), are applied. In addition, in the case of a process analysis, it is possible to specify the sequence of erasing and generating the parts.

The analysis executing part 316 of the structure analyzing part 31 analyzes the analysis model that is created by the first and second analysis model creating parts 311 and 312 according to the structure analysis condition including the material selected by the material data selecting part 313, the contact and tie of the parts defined by the contact and tie defining part 314, and the load and constraint conditions specified by the analysis condition specifying part 315. The analysis evaluating part 317 of the structure analyzing part 31 evaluates the analysis result based on the result evaluation reference data within the result evaluation reference database 216, and stores the evaluated analysis result in the numerical analysis database 212 as the numerical analysis data. It is also possible to store the analysis result of the analysis executing part 316, as it is, in the numerical analysis database 212 as the numerical analysis data.

In a case where the numerical analysis data that are already stored in the numerical analysis database 212 are to be utilized, it is possible to obtain from the analysis model database 213 the analysis model data of the models of the related parts in their entirety, in units of apparatuses or modules (element sets) including the target, when the target is selected by the user.

Next, a description will be given of the heat analyzing part 32.

Figure 14B:
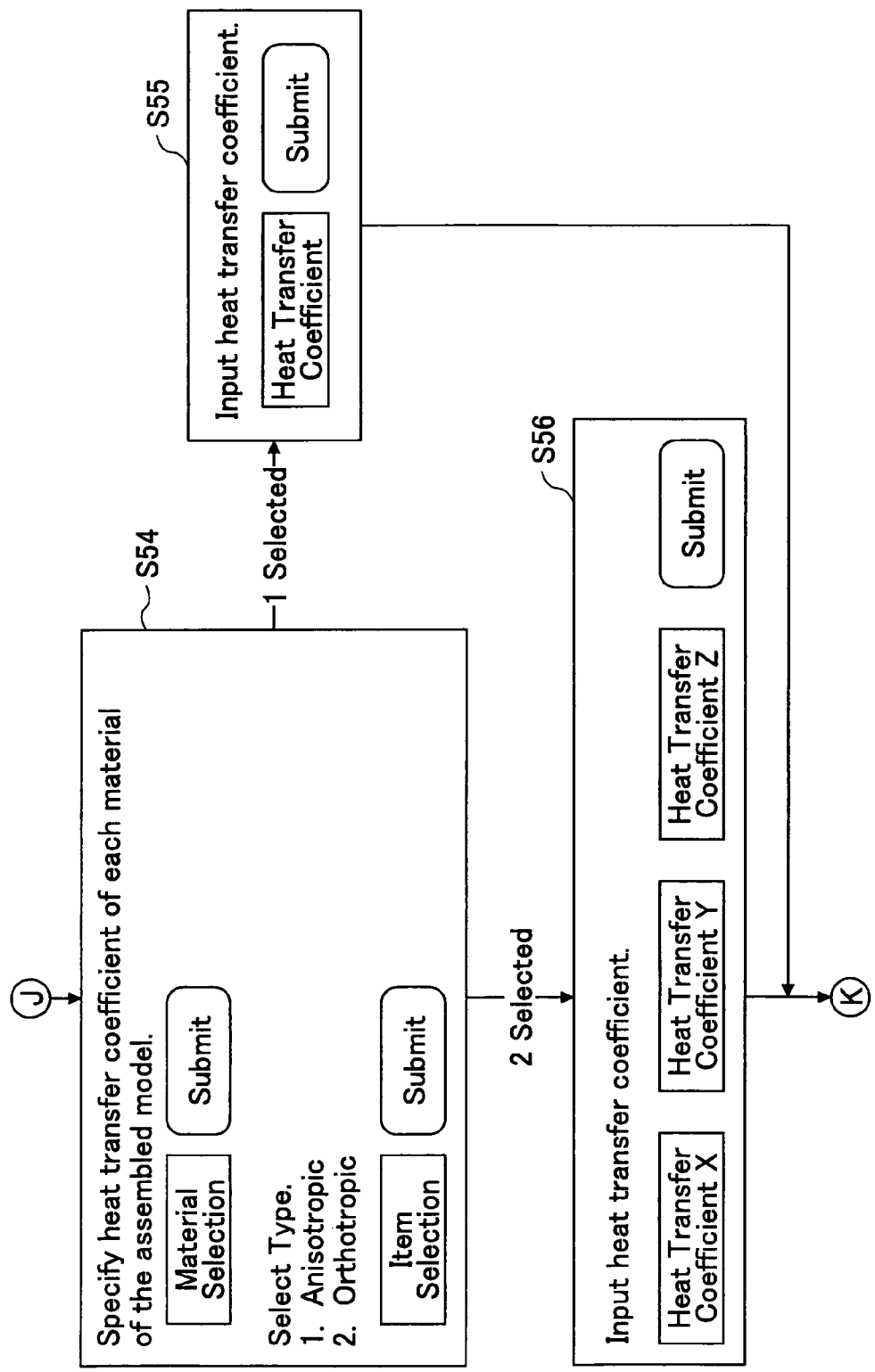

FIGS. 14A through 14C are flow charts for explaining an operation of the heat analysis condition setting part 321 of the heat analyzing part 32. In FIG. 14A, a step S51 urges the user to select a part which is to be subjected to an area division while confirming the parts A and B, in a state where the analysis model that has been combined with the parts A and B is displayed on the display screen 102a of the display as shown on the right side of the step S51. In this case, it is assumed for the sake of convenience that the part B is selected as the part that is to be subjected to the area division. A step S52 automatically divides the area of the selected part B and automatically assigns a recognition symbol to each divided area in a state where the divided areas of the part B are displayed and confirmable on the display screen 102a of the display 102 as shown on the right side of the step S52, for example. A step S53 sets the heat transfer coefficient and the ambient temperature with respect to each divided area of the part B indicated by the recognition symbol. More particularly, the recognition symbol indicated by a corresponding item number is selected, the ambient temperature is input, and the heat transfer coefficient is input, before an "execute" button is selected.

A step S54 shown in FIG. 14B specifies the type of heat transfer coefficient of the material of each of the parts A and B that have been combined. More particularly, each of the parts A and B is specified by selecting each of the parts A and B by a "part select" button and selecting a "submit" button, and the isotropic heat transfer coefficient or the orthotropic heat transfer coefficient is thereafter specified as the type of heat transfer coefficient. If the item number "1" for the isotropic heat transfer coefficient is selected in the step S54 to specify the isotropic heat transfer coefficient, a step S55 determines the heat transfer coefficient by selecting a "heat transfer coefficient" button, inputting the heat transfer coefficient and selecting a "submit" button, and the process advances to a step S57 shown in FIG. 14C which will be described later. On the other hand, if the item number "2" for the orthotropic heat transfer coefficient is selected in the step S54 to specify the orthotropic heat transfer coefficient, a step S56 determines the heat transfer coefficient in each of the X, Y and Z directions. More particularly, the heat transfer coefficient in the X-direction is input after selecting a "heat transfer coefficient X" button, the heat transfer coefficient in the Y-direction is input after selecting a "heat transfer coefficient Y" button, the heat transfer coefficient in the Z-direction is input after selecting a "heat transfer coefficient Z" button, and a "submit" button is selected, so as to determine the heat transfer coefficients in the X, Y and Z directions. The process advances to the step S57 after the step S56.

The step S57 shown in FIG. 14C selects a part that becomes a heat source. More particularly, when a corresponding item number is selected to specify the part that is to become the heat source, the area of the selected part is automatically calculated. If it is assumed for the sake of convenience that the item number "1" is selected in the step S57 to select the part A as the heat source, a step S58 sets the heat value (or heat generation rate) of the part A that is to become the heat source with respect to each of the areas (or surfaces) indicated by an identification symbol. When a "heat value" button is selected, the heat value is input and a "submit" button is then selected, a heat flux value per unit area of the part that becomes the heat source is automatically calculated. A step S59 displays the calculated heat flux value on the display screen 102a of the display 102 when a "display" button is selected, and the calculated heat flux value is determined as the heat flux value per unit area of the part A that becomes the heat source when a "submit" button is selected. A step S60 selects a "temperature input" button, inputs an initial ambient temperature, and then selects a "submit" button, so as to set the initial ambient temperature.

The analysis executing part 322 of the heat analyzing part 32 analyzes the heat analysis condition set by the heat analysis condition setting part 321. The analysis evaluating part 323 of the heat analyzing part 32 evaluates the analysis result based on the result evaluation reference data within the result evaluation reference database 216, and stores the evaluated analysis result, as the numerical analysis data, in the numerical analysis database 212. Of course, it is possible to store the analysis result of the analysis executing part 322, as it is, in the numerical analysis database 212, as the numerical analysis data.

Next, a description will be given of the coupling analyzing part 33.

FIG. 15 is a diagram for explaining an operation of the coupling analysis condition setting part 331 of the coupling analyzing part 33. The coupling analysis condition setting part 331 selects a structure analysis file that has been created by the structure analyzing part 31, and selects a heat analysis file that has been created by the heat analyzing part 32, so as to set the coupling analysis condition. The structure analysis file and the heat analysis file are respectively formed by the numerical analysis data that have been created and stored in the numerical analysis database 212. In addition, it is possible to specify the sequence in which a structural thermal stress analysis is to be carried out using the heat transfer analysis results of the heat analysis file.

The analysis executing part 332 of the coupling analyzing part 33 carries out an analysis according to the coupling analysis condition set by the coupling analysis condition setting part 331 when a "coupling analysis execute" button is selected after setting the coupling analysis condition on the screen shown in FIG. 15. The analysis evaluating part 333 of the coupling analyzing part 33 evaluates the analysis result based on the result evaluation reference data within the result evaluation reference database 216, and stores the evaluated analysis result, as the numerical analysis data, in the numerical analysis database 212. Of course, it is possible to store the analysis result of the analysis executing part 332, as it is, in the numerical analysis database 212, as the numerical analysis data.

This application claims the benefit of a Japanese Patent Application No. 2006-031595 filed Feb. 8, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A numerical analysis data creating method for creating, by a computer, numerical analysis data that are obtained by analyzing an analyzing target, comprising: displaying on a display device, by the computer, a message urging a user to make a selection from an input device on whether or not to create the numerical analysis data of the analyzing target using data stored in a database;

searching step searching the database, by the computer, based on information related to the analyzing target, in response to receiving from the input device the selection to create the numerical analysis data of the analyzing target using the data stored in the database, and displaying a search result on the display device; and creating, by the computer, the numerical analysis data of the analyzing target by interactively modifying data of the search result displayed on the display device, and storing the numerical analysis data of the analyzing target in the database, wherein the data stored in the database include numerical analysis data, analysis model data, material characteristic data and attribute data with respect to analyzed targets, and wherein the creating interactively modifies at least one condition in the analysis model data selected from a heat analysis condition and a coupling analysis condition of each element forming the analyzing target.

2. The numerical analysis data creating method as claimed in claim 1, wherein the numerical analysis data are stored in the database at least for each element set forming the targets, by being separated and classified for each analyzing information type including structure information, heat information and coupling information.

3. The numerical analysis data creating method as claimed in claim 1, wherein the attribute information is stored in a form of a tree structure within the database, and includes:
- a field name of enterprise, product name, unit or module name, part name and a material name of apparatuses and parts including the target;
- a storage address of a three-dimensional shape data within the database;
- a storage address of the numerical analysis data within the database;
- a storage address of the analysis model data within the database;
- a storage address of the material characteristic data within the database; and
- storage addresses of a mutual relationship condition indicating a contact and a tie of other apparatuses and parts, a constraint condition, and a load condition within the database.

4. The numerical analysis data creating method as claimed in claim 1, wherein the creating reflects actually measured data to the analysis model data when the database stores the actually measured data including warp, undulation and surface temperature of the analyzing target or of an element forming the analyzing target.

5. The numerical analysis data creating method as claimed in claim 1,
- wherein the searching searches data with respect to the analyzing target and similar targets, which are similar to the analyzing target, within the database, using, as a keyword, at least one information of the analyzing target selected from a group consisting of a field name of enterprise, a product name, a unit or module name, a part name, and a material name, and displays the analysis model data corresponding to the keyword on the display device as the search result, and
- wherein the creating further reflects to the analysis model data at least one condition selected from a group consisting of a mutual relationship condition defining contact and tie of elements forming the analyzing target, a constraint condition, and a load condition of each element forming the analyzing target.

6. A non-transitory computer-readable storage medium on which a computer-readable program for causing a computer to create numerical analysis data by analyzing an analyzing target is stored, said program comprising:
- an urging procedure causing the computer to display on a display device a message urging a user to make a selection from an input device on whether or not to create the numerical analysis data of the analyzing target using data stored in a database;
- a searching procedure causing the computer to search the database based on information related to the analyzing target, in response to receiving from the input device the selection to create the numerical analysis data of the analyzing target using the data stored in the database, and display a search result on the display device; and
- a creating procedure causing the computer to create the numerical analysis data of the analyzing target by interactively modifying data of the search result displayed on the display device, and store the numerical analysis data of the analyzing target in the database,
- wherein the data stored in the database include numerical analysis data, analysis model data, material characteristic data and attribute data with respect to analyzed targets, and
- wherein the creating procedure causes the computer to interactively modify at least one condition in the analysis model data selected from a heat analysis condition and a coupling analysis condition of each element forming the analyzing target.

7. The non-transitory computer-readable storage medium as claimed in claim 6,
- wherein the searching module to search data with respect to the analyzing target and similar targets, which are similar to the analyzing target, within the database, using, as a keyword, at least one information of the analyzing target selected from a group consisting of a field name of enterprise, a product name, a unit or module name, a part name, and a material name, and displays the analysis model data corresponding to the keyword on the display device as the search result, and
- wherein the creating procedure further reflects to the analysis model data at least one condition selected from a group consisting of a mutual relationship condition defining contact and tie of elements forming the analyzing target, a constraint condition, and a load condition of each element forming the analyzing target.

8. A numerical analysis data creating apparatus for creating numerical analysis data that are obtained by analyzing an analyzing target, comprising:
- a processor configured to utilize instructions, stored on a computer-readable storage medium, including:
- an urging module configured to display on a display device a message urging a user to make a selection from an input device on whether or not to create the numerical analysis data of the analyzing target using data stored in a database;
- a searching module configured to search the database based on information related to the analyzing target, in response to receiving from the input device the selection to create the numerical analysis data of the analyzing target using the data stored in the database, and display a search result on the display device; and
- a creating module configured to create the numerical analysis data of the analyzing target by interactively modifying data of the search result displayed on the display device, and store the numerical analysis data of the analyzing target in the database,
- wherein the data stored in the database include numerical analysis data, analysis model data, material characteristic data and attribute data with respect to analyzed targets, and
- wherein the creating module interactively modifies at least one condition in the analysis model data selected from a heat analysis condition and a coupling analysis condition of each element forming the analyzing target.

9. The numerical analysis data creating apparatus as claimed in claim 8, wherein the numerical analysis data are stored in the database at least for each element set forming the targets, by being separated and classified for each analyzing information type including structure information, heat information and coupling information.

10. The numerical analysis data creating apparatus as claimed in claim 8, wherein the attribute information is stored in a form of a tree structure within the database, and includes:
- a field name of enterprise, product name, unit or module name, part name and a material name of apparatuses and parts including the target;
- a storage address of a three-dimensional shape data within the database;
- a storage address of the numerical analysis data within the database;
- a storage address of the analysis model data within the database;

a storage address of the material characteristic data within the database; and storage addresses of a mutual relationship condition indicating a contact and a tie of other apparatuses and parts, a constraint condition, and a load condition within the database.

11. The numerical analysis data creating apparatus as claimed in claim 8, wherein the creating module reflects actually measured data to the analysis model data when the database stores the actually measured data including warp, undulation and surface temperature of the analyzing target or of an element forming the analyzing target.

12. The numerical analysis data creating apparatus as claimed in claim 8, comprising at least a portion of the database.

13. The numerical analysis data creating apparatus as claimed in claim 8, wherein the searching module searches data with respect to the analyzing target and similar targets, which are similar to the analyzing target, within the database, using, as a keyword, at least one information of the analyzing target selected from a group consisting of a field name of enterprise, a product name, a unit or module name, a part name, and a material name, and displays the analysis model data corresponding to the keyword on the display device as the search result, and wherein the creating module further reflects to the analysis model data at least one condition selected from a group consisting of a mutual relationship condition defining contact and tie of elements forming the analyzing target, a constraint condition, and a load condition of each element forming the analyzing target.

\* \* \* \* \*

UNITED STATES PATENT AND TRADEMARK OFFICE
CERTIFICATE OF CORRECTION

PATENT NO.         : 8,533,184 B2                                Page 1 of 1
APPLICATION NO.    : 11/504727
DATED              : September 10, 2013
INVENTOR(S)        : Yoko Kobayashi et al.

It is certified that error appears in the above-identified patent and that said Letters Patent is hereby corrected as shown below:

In the Claims:

In Column 14, Line 42, In Claim 1, before "searching" delete "searching step".

Signed and Sealed this
Twenty-fourth Day of December, 2013

Margaret A. Focarino
*Commissioner for Patents of the United States Patent and Trademark Office*